(12) United States Patent
Roh et al.

(10) Patent No.: US 12,117,521 B2
(45) Date of Patent: Oct. 15, 2024

(54) RADAR DEVICE

(71) Applicant: HYUNDAI MOBIS CO., LTD., Seoul (KR)

(72) Inventors: Hee Chang Roh, Suwon-si (KR); Sung Ho Bae, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 289 days.

(21) Appl. No.: 17/332,381

(22) Filed: May 27, 2021

(65) Prior Publication Data

US 2021/0373152 A1 Dec. 2, 2021

(30) Foreign Application Priority Data

May 28, 2020 (KR) ........................ 10-2020-0064516

(51) Int. Cl.
| | |
|---|---|
| *G01S 13/931* | (2020.01) |
| *G01S 7/02* | (2006.01) |
| *G01S 13/42* | (2006.01) |
| *H01Q 1/32* | (2006.01) |
| *H01Q 1/42* | (2006.01) |

(52) U.S. Cl.
CPC ............ *G01S 13/931* (2013.01); *G01S 7/027* (2021.05); *G01S 13/42* (2013.01); *H01Q 1/3233* (2013.01); *H01Q 1/42* (2013.01)

(58) Field of Classification Search
CPC ........ G01S 13/931; G01S 7/027; G01S 13/42; G01S 13/04; G01S 13/87; G01S 7/02; G01S 7/032; G01S 2013/93271; G01S 2013/93272; H01Q 1/3233; H01Q 1/42
See application file for complete search history.

(56) References Cited

U.S. PATENT DOCUMENTS

| | | | | |
|---|---|---|---|---|
| 5,512,901 | A * | 4/1996 | Chen ..................... | H01Q 13/10 |
| | | | | 342/175 |
| 10,044,099 | B2 * | 8/2018 | Leung ................ | H01Q 21/0075 |
| 2016/0291146 | A1 * | 10/2016 | Wang .................... | G01S 13/867 |

(Continued)

FOREIGN PATENT DOCUMENTS

| | | |
|---|---|---|
| CN | 106970381 A | 7/2017 |
| CN | 207008054 U | 2/2018 |

(Continued)

OTHER PUBLICATIONS

"Dielectric constant—wikidoc.pdf" from https://web.archive.org/web/20150308090031/http://wikidoc.org:80/index.php/Dielectric_constant (Year: 2015).*

(Continued)

*Primary Examiner* — Olumide Ajibade Akonai
*Assistant Examiner* — Yonghong Li
(74) *Attorney, Agent, or Firm* — Morgan, Lewis & Bockius LLP

(57) ABSTRACT

A radar device is disclosed. The present disclosure in some embodiment provides a radar device configured to detect a target in front by using an antenna configured to transmit and receive a radar signal, including a housing having an upper side formed with an aperture to which a radome is coupled, a radar package disposed inside the housing and comprising the antenna, a signal processor, and a target information calculator, and a circuit board mounted with the radar package and a power block.

12 Claims, 4 Drawing Sheets

(56) References Cited

U.S. PATENT DOCUMENTS

| | | |
|---|---|---|
| 2017/0102453 A1 | 4/2017 | Lim et al. |
| 2017/0276788 A1* | 9/2017 | Wodrich ............... G01S 13/878 |
| 2019/0165483 A1* | 5/2019 | Shiozaki ................ H01Q 21/08 |
| 2019/0212438 A1 | 7/2019 | Kim |
| 2019/0339382 A1 | 11/2019 | Hess et al. |
| 2019/0375358 A1 | 12/2019 | Lee et al. |
| 2020/0025913 A1* | 1/2020 | Park ......................... H01Q 1/32 |
| 2020/0110155 A1* | 4/2020 | Cho ........................ G01S 7/027 |
| 2023/0014401 A1 | 1/2023 | Hess et al. |

FOREIGN PATENT DOCUMENTS

| | | |
|---|---|---|
| CN | 109565304 A | 4/2019 |
| CN | 109669166 A | 4/2019 |
| CN | 110031845 A | 7/2019 |
| CN | 110226102 A | 9/2019 |
| KR | 10-1356169 B1 | 1/2014 |
| KR | 10-2018-0103584 A | 9/2018 |

OTHER PUBLICATIONS

Chinese Office Action dated Jun. 10, 2023, issued in corresponding Chinese Patent Application No. 202110566172.5.

Office Action issued on Dec. 21, 2023 in ChinesePatent Application No. 202110566172.5 with English translation.

\* cited by examiner

RADAR DEVICE

CROSS-REFERENCE TO RELATED APPLICATIONS

This application is based on, and claims priority from, Korean Patent Application Number 10-2020-0064516, filed May 28, 2020, the disclosure of which is incorporated by reference herein in its entirety.

TECHNICAL FIELD

The present disclosure in some embodiments relates to a radar device.

BACKGROUND

The statements in this section merely provide background information related to the present disclosure and do not necessarily constitute prior art.

The recent increment of vehicle safety and convenience functions for drivers such as adaptive cruise control (ACC), autonomous emergency braking (AEB), and autonomous parking is motivating the active development of sensors for identifying the situation around the vehicle. Sensors attached to a vehicle include an image sensor, a lidar, a radar, and an ultrasonic sensor.

Among these sensors, the radar can be advantageously installed internally of the vehicle when the lidar cannot, and radar can observe a longer distance than the ultrasonic sensor. Unlike image sensors, radar sensors are hardly affected by the weather.

Recently, a radar sensor is also used in place of an ultrasonic sensor when parking a vehicle. By installing a plurality of radar sensors, a high-angle field of view (FOV) can be formed and a longer distance can be observed than with ultrasonic sensors. However, as the number of radar sensors disposed in the vehicle increases, the manufacturing cost of the vehicle undesirably increases, and the limited space in which the radar sensors can be disposed in the vehicle needs miniaturization of the radar sensor.

SUMMARY

According to at least one embodiment, the present disclosure provides a radar device configured to detect a target in front by using an antenna configured to transmit and receive a radar signal, including a housing, a radar package, and a circuit board. The housing has an upper side formed with an aperture to which a radome is coupled. The radar package is disposed inside the housing and includes the antenna, a signal processor, and a target information calculator. The circuit board is mounted with the radar package and a power block.

According to another embodiment, the present disclosure provides a vehicle that is mounted with a plurality of radar devices including multiples of the radar device, the vehicle including a plurality of radomes composed of multiples of the radome disposed to face outwardly and in the front and the rear of the vehicle.

REFERENCE NUMERALS

Figure 1:
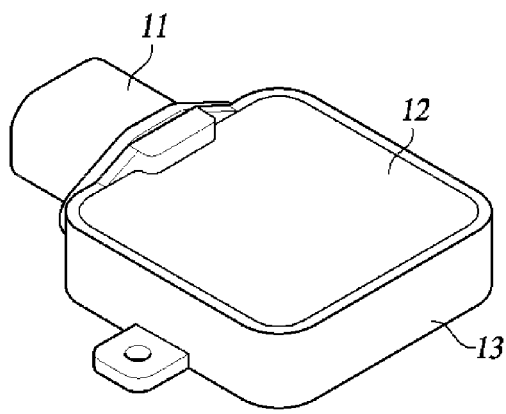
FIG. 1 is a perspective view of a radar device according to at least one embodiment of the present disclosure.

| | |
|---|---|
| 10: radar device | 11: connector |
| 12: radome | 13: side housing |
| 14: circuit board | 15: lower housing |
| 31: power block | 32: memory block |
| 33: radar package | 34: antenna |
| 35: signal processor | 36: target information calculator |
| 37: CAN transceiver | |

DETAILED DESCRIPTION

The present disclosure in at least one embodiment seeks to provide a miniaturized radar device by structurally improving the arrangement of the components inside the radar device.

The present disclosure in another embodiment seeks to structurally improve the internal component layout of a radar device for simplifying the manufacturing process and reducing the manufacturing cost.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 2:
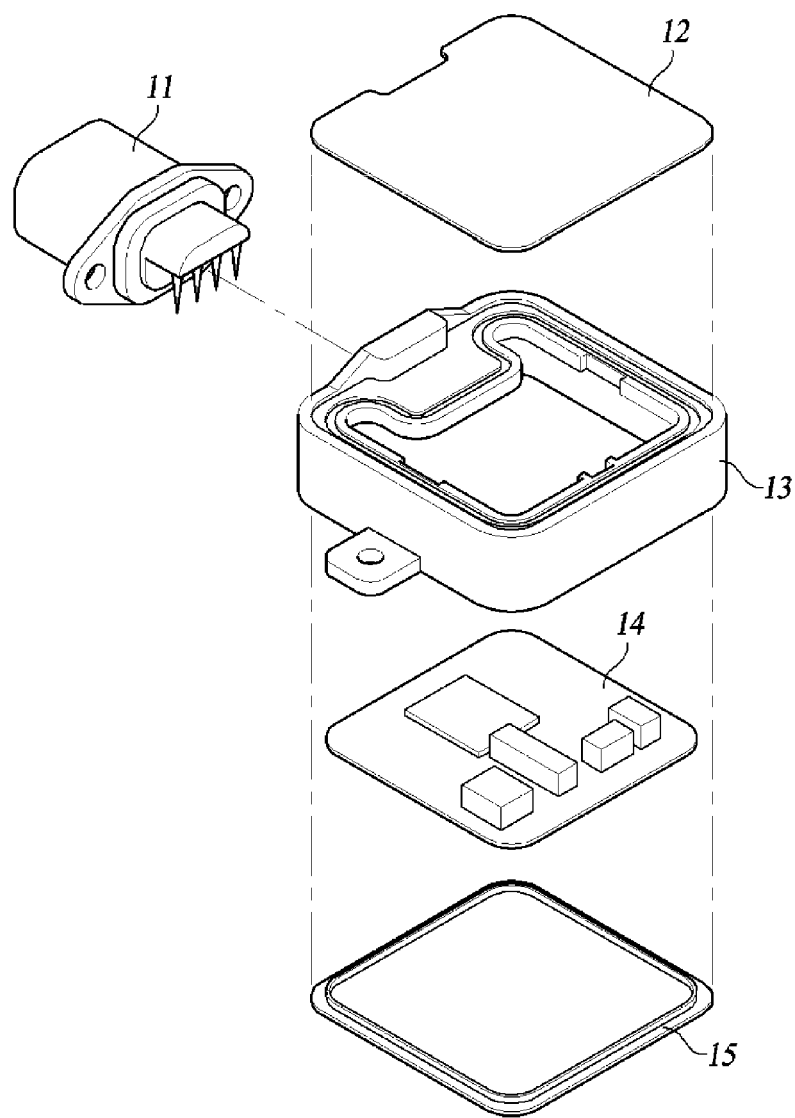
FIG. 2 is an exploded perspective view of a radar device according to at least one embodiment of the present disclosure.

FIG. 1 is a perspective view of a radar device according to at least one embodiment of the present disclosure. FIG. 2 is an exploded perspective view of a radar device according to at least one embodiment of the present disclosure.

As shown in FIGS. 1 and 2, a radar device 10 includes all or some of a connector 11, a radome 12, a circuit board 14, and a housing 13 and 15.

The connector 11 is a device that outwardly transmits a target-related signal generated by a calculation performed by the radar package 33. For example, a target-related signal is transmitted to an electronic control unit or ECU (not shown) of the vehicle for the ECU to utilize in detecting the surrounding environment of the vehicle.

The radome 12 is disposed in a direction in which the radar device 10 transmits a radar signal. The radome 12 needs to be made of a material through which the radar signal can pass. The radome 12 is made of a material capable of reducing the attenuation of transmitted and received radar signals, and the radome 12 may be composed of the front and rear bumpers of a vehicle, a grille, a side surface of a vehicle, or an outer surface of a vehicle component.

The housing 13 and 15 is adapted to protectively enclose the circuit board 14, the radar package 33, and others within the radar device 10. The housing 13 and 15 may be composed of housing sides 13 and a housing bottom 15, which may be integrally manufactured by injection molding or may be fastened after a pre-injection-molding process.

The circuit board 14 is mounted with all or some of a power block 31, a memory block 32, and the radar package 33. The surface of the circuit board 14, on which the radar package part 33 is mounted may be made of a material having a lower permittivity than the opposite surface of the circuit board 14. The low-permittivity material allows the circuit board 14 to reduce the loss of transmitted and received radar signals. Components mounted on the circuit board 14 will be described in detail referring to FIG. 3.

Figure 3:
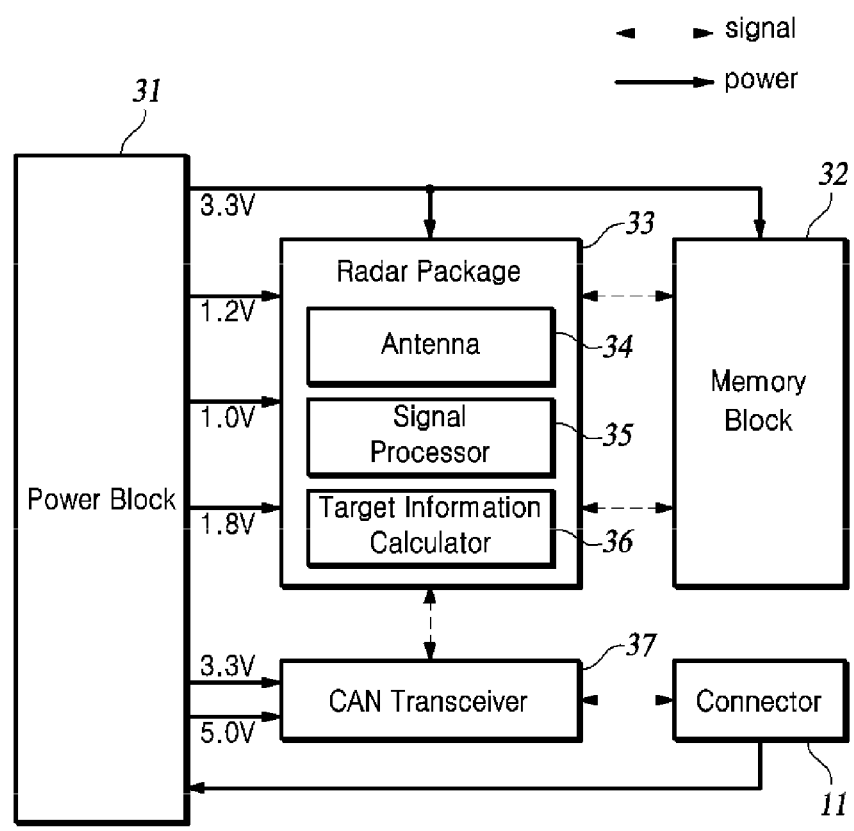
FIG. 3 is a block diagram for a detailed description of a circuit board disposed in the radar device of the present disclosure.

FIG. 3 is a block diagram for a detailed description of a circuit board disposed in the radar device of the present disclosure.

As shown in FIG. 3, the circuit board 14 includes all or some of the power block 31, memory block 32, radar package 33, and a controller area network (CAN) transceiver 37.

The power block 31 may receive a power voltage from the outside and apply a voltage required for the operation of the memory block 32, radar package 33, and CAN transceiver 37. For example, the power block 31 may receive a power voltage of 12 V from the vehicle and convert the voltage level to apply voltages of 1.0 V, 1.2 V, 1.8 V, and 3.3 V to the radar package 33. Additionally, the power block 31 may apply a voltage of 3.3 V to the memory block 32 and may apply voltages of 2.3 V and 5.0 V to the CAN transceiver 37. The magnitude and number of voltages that the power block 31 applies to the memory block 32, radar package 33, CAN transceiver 37, and others are not limited to these particulars, and voltages are all inclusive for normal operation of the respective components.

The memory block 32 may include an Erasable Programmable Read Only Memory (EPROM, not shown) and a flash memory (not shown). The EPROM may store a message about an error occurring in the radar device 10. A flash memory (not shown) when applied with a power of 12 V downloads a program for operating the radar package 33. The memory block 32 may transmit and receive signals to and from the radar package 33. The memory block 32 is not an essential component of the present disclosure.

The radar package 33 includes all or some of an antenna 34, a signal processor 35, and a target information calculator 36.

The antenna 34 includes a plurality of transmitter groups or a plurality of receiver groups for transmitting and receiving a radar signal. Each transmitter group includes a plurality of transmitters, and each receiver group includes a plurality of receivers. For example, each transmitter group or each receiver group may include four (4) transmitters or four (4) receivers. The radar device 10 may employ a signal transmission/reception method incorporating a multi-dimensional antenna array and multi-input multi-output (MIMO) scheme to form a virtual antenna aperture larger than a physical antenna aperture.

For example, to improve angular accuracy and resolution in horizontal and vertical directions, a 2-dimensional antenna array is used. With a 2D antenna array used, signals are transmitted and received in two separate scans in horizontal and vertical directions, and the MIMO scheme may be used separately from the 2D horizontal scan and vertical scan. More specifically, when the antenna 34 includes three (3) transmitter groups and four (4) receiver groups, that is, when including twelve (12) transmitters and sixteen (16) receivers, a layout of 192 virtual receive antennas may be obtained by using the MIMO scheme. The 2D antenna array may have a layout such as a rhombus grid, a V-shape, or an X-shape.

When using the MIMO scheme, the respective transmitters may transmit radar signals having independent waveforms that is distinguished from each other. Each transmitter may transmit a radar signal of an independent waveform that is distinguished from other transmitters', and each receiver may determine, based on the difference in waveforms of the radar signals, the transmit antenna from which the radar signal has been transmitted and reflected by an object.

The signal processor 35 removes noise from the signals received by the receivers. The signal processor 35 removes signal components other than the frequency band corresponding to the radar signals transmitted by the transmitters by using a bandpass filter while removing signals upon reception by the transmitted radar signal being reflected by a road surface. A moving average method may be used to remove noise other than the reflected signals. Here, the moving average method is a method of utilizing the average value of data in a time series corresponding to a certain period to inform of the overall tendency. The filtering method for removing the noise signal by the signal processor 35 is not limited to the above examples, and anyone of ordinary skill in the art may add, remove, or change other types of filters.

The target information calculator 36 calculates target information based on the signals processed by the signal processor 35. The target information calculator 36 may include a target detector (not shown) for detecting a radar signal reflected from a target, a distance calculator (not shown) for measuring a separation distance from the detected target to the radar device 10, and an azimuth calculator (not shown) for measuring an azimuth angle from the detected target to the radar device 10. Additionally, the target information calculator 36 may also measure the moving speed of the target. The target information calculator 36 transmits the calculated target information to the CAN transceiver 37

Arranging the antenna 34, signal processor 35, and target information calculator 36 inside the radar package 33 can simplify the manufacturing process better than mounting the signal processor 35 and the target information calculator 36 on the circuit board 14 externally of the radar package 33. With the radar package 33 composed of the antenna 34, signal processor 35, and target information calculator 36, mounting the radar package 33 alone on the circuit board 14 can simplify the manufacturing process. The signal processor 35 and the target information calculator 36 when mounted separately would incur an additional process of mounting the components separately.

The radar package 33 may include first to third transmitter groups and first to fourth receiver groups. There is no limitation to the number of the transmitter groups and the receiver groups arranged in the radar package 33.

The first to third transmitter groups are disposed at predetermined intervals in a first direction, and the first to fourth receiver groups are disposed at predetermined distances in a second direction. Here, the first direction is an arbitrary direction, and the second direction is a direction perpendicular to the first direction. Here, the predetermined interval may be a value obtained by dividing by two the wavelength of the radar signal transmitted by the radar device 10.

For example, the first to third transmitter groups may be arranged at regular intervals in the horizontal direction, and the first to fourth receiver groups may be arranged at regular intervals in the vertical direction.

The CAN transceiver 37 finally transmits to the connector 11 the target information received from the target information calculator 36.

Figure 4:
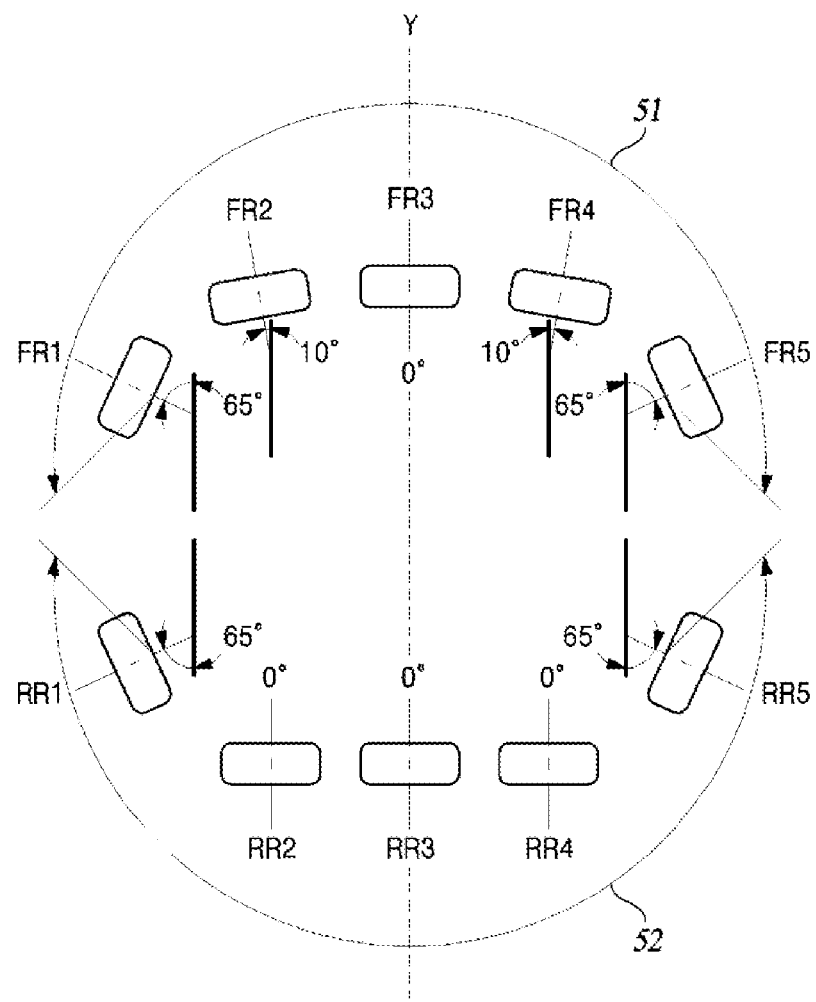
FIG. 4 is a schematic diagram of a vehicle installed with radar devices according to at least one embodiment of the present disclosure is disposed.

FIG. 4 is a schematic diagram of a vehicle installed with radar devices according to at least one embodiment of the present disclosure is disposed. Here, a Y-axis represents the central axis of the vehicle.

As shown in FIG. 4, multiples of the radar device 10 of FR1 to FR5 may be disposed in the front of the vehicle, and multiples of the radar device 10 of RR1 to RR5 may be disposed at the rear of the vehicle. Here, FR is a Front Radar which means the front radar device 10, and RR is a Rear Radar which means the rear radar device 10.

The following describes a layout of FR1 to FR5 disposed in the front of the vehicle according to at least one embodiment of the present disclosure. The FR3 may be placed in the center of the vehicle so that radar signals may be transmitted around the Y-axis. FR2 and FR4 may be spaced apart from each other and the center of the vehicle at equal intervals, and they may be arranged at an inclination of 10 degrees from the Y-axis facing outwardly of the vehicle. FR1 and FR5 may be spaced apart from the center of the vehicle at equal intervals, respectively, and they may be disposed at the outermost sides by inclining 65 degrees from the Y-axis facing outwardly of the vehicle. In other words, the farther the radar device 10 is disposed from the Y-axis, the central axis of the vehicle, the more the radar device 10 may be inclined and disposed at a larger angle from the Y-axis.

The following describes a layout of RR1 to RR5 disposed in the rear of the vehicle according to at least one embodiment of the present disclosure. RR3 may be placed in the center of the vehicle so that radar signals may be transmitted around the Y-axis. FR2 and FR4 may be spaced apart from the center of the vehicle at equal intervals, respectively, and they may be arranged to face in a direction parallel to the Y-axis. FR1 and FR5 may be spaced apart from the center of the vehicle at equal intervals, respectively, and they may be disposed at the outermost sides by inclining 65 degrees from the Y-axis facing outwardly of the vehicle. In other words, among the radar devices 10 disposed at the rear of the vehicle, the radar devices 10 disposed at the outermost sides may be disposed to be inclined at the largest angle from the Y-axis.

When the radar devices 10 are arranged as disclosed in FIG. 4, the vehicle may have a front FOV (field of view) 51 and a rear FOV 52 which are 270 degrees or more. With this layout of the radar devices 10, the vehicle when parked can detect not only the front/rear thereof but also a side target.

Even with a reduced number of radar devices 10 disposed in the vehicle by arranging three radar devices 10 of FR1, FR3, and FR5 in the front of the vehicle and three radar devices 10 of RR1, RR3, and RR5 in the rear of the vehicle, the vehicle may have the front FOV 51 and the rear FOV 52 of greater than or equal to 270 degrees. Alternatively, with four radar devices 10 of FR1, FR2, FR4, and FR5 placed in the front of the vehicle and four radar devices 10 of RR1, RR2, RR4, and RR5 placed in the rear of the vehicle, the vehicle may have the front FOV 51 and the rear FOV 52 of greater than or equal to 270 degrees. The front FOV 51 and the rear FOV 52 are preferably 250 degrees or more to detect a target in the side by using the radar devices 10 disposed in the front and rear of the vehicle.

The layout of the radar devices 10 disposed on the vehicle is not limited to the embodiment of FIG. 4. For example, radar devices 10 may be additionally disposed on the left and right sides of the vehicle to further increase the accuracy of detecting side targets.

As described above, according to at least one embodiment of the present disclosure, the radar device is configured to have a reduced internal space by mounting the radar package on the circuit board, thereby allowing the radar device to be miniaturized.

Further, providing the radar package with antennas and a controller can reduce manufacturing costs by simplifying the manufacturing process.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A radar device configured to detect a target in front by using an antenna configured to transmit and receive a radar signal, comprising:
    a housing having an upper side formed with an aperture to which a radome is coupled;
    a radar package disposed inside the housing and comprising the antenna, a signal processor, and a target information calculator; and
    a circuit board mounted with the radar package and a power block,
    wherein the antenna, the signal processor, and the target information calculator of the radar package are mounted on the same surface of the circuit board facing the radome,
    wherein the upper side of the housing includes a recess having an upper surface in which the aperture is formed,
    wherein the radome is disposed on the upper surface of the recess, and the circuit board is disposed on an opposite side of the recess, and
    wherein a side wall of the housing formed by the recess covers an outermost side surface of the radome.

2. The radar device of claim 1, wherein the antenna comprises
    a plurality of transmitter groups and a plurality of receiver groups,
    wherein the plurality of transmitter groups and the plurality of receiver groups are each arranged to be spaced apart from one another at predetermined intervals.

3. The radar device of claim 1, wherein the antenna comprises
    a plurality of transmitter groups and a plurality of receiver groups,
    wherein the plurality of transmitter groups are arranged at predetermined intervals in a first direction, and the plurality of receiver groups are arranged at predetermined intervals in a second direction perpendicular to the first direction.

4. The radar device of claim 1, wherein the circuit board has one surface that is mounted with the radar package and made of a material having a lower permittivity than an opposite surface of the circuit board.

5. A vehicle comprising:
a plurality of radar devices each of which is configured to detect a target in front by using an antenna configured to transmit and receive a radar signal, wherein each of the radar devices comprises:
a housing having an upper side formed with an aperture to which a radome is coupled;
a radar package disposed inside the housing and comprising the antenna, a signal processor, and a target information calculator;
a circuit board mounted with the radar package and a power block; and
a plurality of radomes comprising multiples of the radome disposed to face outwardly and disposed in a front and a rear of the vehicle,
wherein the upper side of the housing includes a recess having an upper surface in which the aperture is formed,
wherein the radome is disposed on the upper surface of the recess, and the circuit board is disposed on an opposite side of the recess,
wherein among the plurality of radar devices, each of radar devices disposed in the front of the vehicle and spaced from a central axis of the vehicle is inclined at angle from the central axis of the vehicle, and
wherein a side wall of the housing formed by the recess covers an outermost side surface of the radome.

6. The vehicle of claim 5, wherein the plurality of radar devices disposed in the front and the rear of the vehicle has a radar device that is disposed farthest from the central axis of the vehicle and inclined at a largest angle from the central axis of the vehicle, among the plurality of radar devices disposed in the front and the rear of the vehicle.

7. The vehicle of claim 5, wherein the plurality of radar devices comprises
radar devices that are inclined at increased angles from the central axis of the vehicle in proportion to distances of the radar devices from the central axis.

8. The vehicle of claim 5, wherein the plurality of radar devices disposed in the front and the rear of the vehicle have a field of view (FOV) of 250 degrees or more.

9. A vehicle mounted with a plurality of radar devices comprising multiples of the radar device as claimed in claim 2, the vehicle comprising
a plurality of radomes comprising multiples of the radome disposed to face outwardly and disposed in a front and a rear of the vehicle.

10. A vehicle mounted with a plurality of radar devices comprising multiples of the radar device as claimed in claim 3, the vehicle comprising
a plurality of radomes comprising multiples of the radome disposed to face outwardly and disposed in a front and a rear of the vehicle.

11. A vehicle mounted with a plurality of radar devices comprising multiples of the radar device as claimed in claim 4, the vehicle comprising
a plurality of radomes comprising multiples of the radome disposed to face outwardly and disposed in a front and a rear of the vehicle.

12. A vehicle comprising:
a plurality of radar devices each of which is configured to detect a target in front by using an antenna configured to transmit and receive a radar signal, wherein each of the radar devices comprises:
a housing having an upper side formed with an aperture to which a radome is coupled;
a radar package disposed inside the housing and comprising the antenna, a signal processor, and a target information calculator;
a circuit board mounted with the radar package and a power block; and
a plurality of radomes comprising multiples of the radome disposed to face outwardly and disposed in a front and a rear of the vehicle,
wherein the upper side of the housing includes a recess having an upper surface in which the aperture is formed,
wherein the radome is disposed on the upper surface of the recess, and the circuit board is disposed on an opposite side of the recess, and
wherein a side wall of the housing formed by the recess covers an outermost side surface of the radome.

* * * * *